Oct. 9, 1951   G. F. CHODZIESNER   2,570,918
METHOD OF SELECTIVELY COLLECTING AND/OR DISTRIBUTING ARTICLES
Filed Sept. 30, 1947   2 Sheets-Sheet 1

Inventor:
Georg F. Chodziesner
By Ward, Crosby & Neal
Attorneys

Patented Oct. 9, 1951

2,570,918

UNITED STATES PATENT OFFICE 2,570,918

METHOD OF SELECTIVELY COLLECTING AND/OR DISTRIBUTING ARTICLES

Georg F. Chodziesner, Bondi, near Sydney, New South Wales, Australia, assignor to Communication Engineering Pty. Limited, Cammeray, near Sydney, New South Wales, Australia, a corporation of Australia Application September 30, 1947, Serial No. 777,094
In Australia October 16, 1946

6 Claims. (Cl. 186—1)

The invention relates to a method of selectively collecting and/or distributing articles from storage. In stores where a great variety of articles is to be sold, valuable time is lost when the shop assistant has to collect articles of various kinds from the shelves where they are stored. In many cases the storage place in the shop itself is only limited and the articles have to be fetched from another storage room. The customer has to wait and in busy hours further delays occur as one shop assistant has to wait for the other to clear the way.

These difficulties are overcome according to the invention by a system for dispensing articles of different kinds from storage in which a control station or operator's position is provided for selecting articles for separate individual orders. The articles are stored in bins, arranged in groups and associated therewith are indicating devices including a plurality of indicating means for each bin, to indicate the sequence of orders of desired articles. The control station is electrically connected over switching means with the indicating means to indicate simultaneously the desired articles for several consecutive orders, keyed up at the control station. Further means are provided to give an indication when all of the selected articles have been taken to complete an order and are passed on to conveying means to convey the selected articles to a delivery position.

It is another feature of the invention to indicate all items belonging to the same order and article group simultaneously and furthermore, to indicate at the same time the consecutive order, so that the next order can be prepared for delivery while the first order is still on the conveying mechanism.

According to a further feature of the invention, the indication for a wanted kind of article is modified in accordance with the quantity of the kind of article to be delivered for one order.

These and other features of the invention will be more clearly understood from the following description in connection with the drawings which show one embodiment of the invention.

Figure 1:
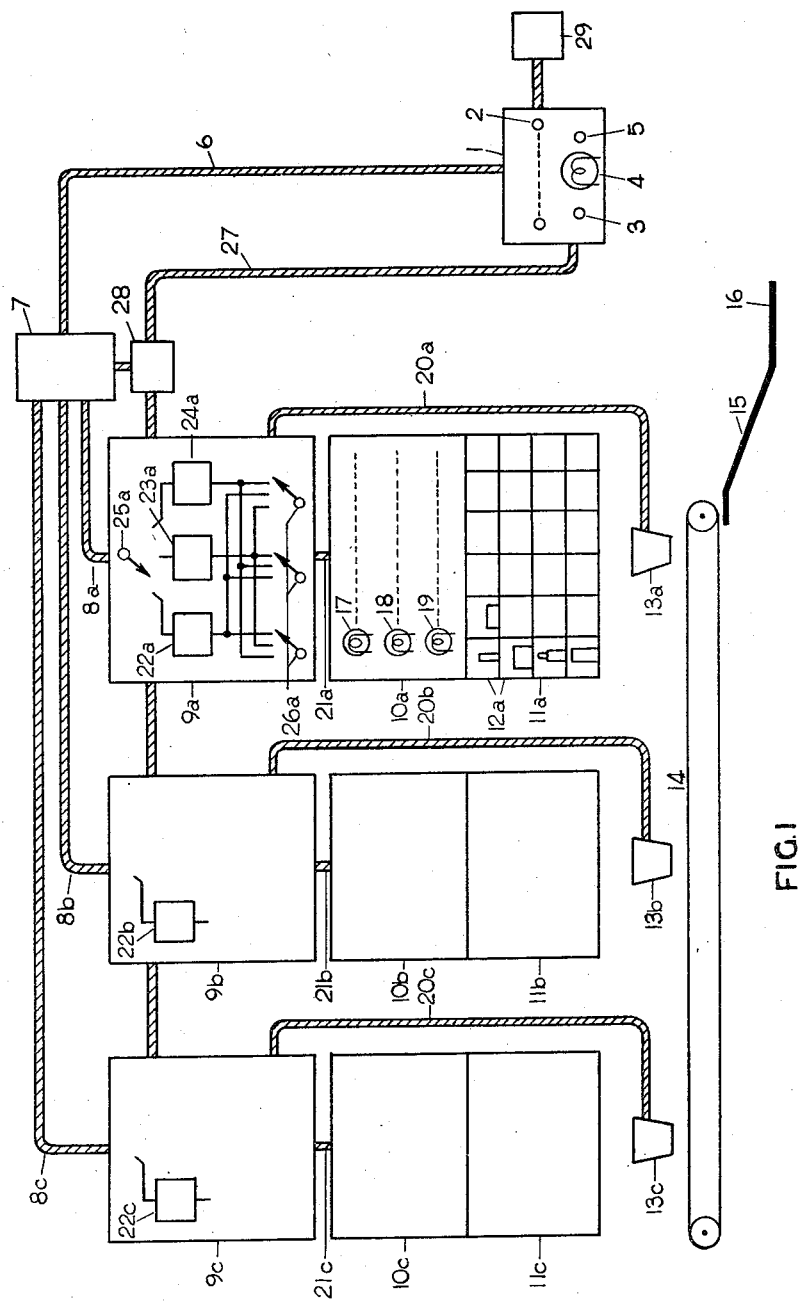
Fig. 1 shows schematically one arrangement of the invention comprising three article groups.

Referring to Fig. 1 an operator's position consists of the key arrangement 1 comprising one or more rows of keys 2 in which each key represents one numerical value of the designation or code allotted to each kind of article. A separate key 3 is provided which is operated whenever an order has been completed and a "busy" lamp 4 lights up whenever the system is full and cannot accept any new orders. In cases where the quantity of each kind of article to be dispensed is to be indicated as well, an additional key 5 can be provided at the operator's position. All the keys can be operated either by a shop assistant or a customer himself.

The articles are stored in a storage room which can be located at any suitable distance from the shop itself. The storage room contains shelves 11a, 11b and 11c and each shelf used for one article group is sub-divided in bins as shown at 12a. Each bin is carrying articles of the same kind. An order routing device 9a, 9b, 9c is allotted to each of the shelves 11a, 11b and 11c.

The key arrangement 1 is electrically connected via the cable 6 with a selective switching device 7 and this device transfers the designation of the wanted articles keyed up at the key arrangement 1 via electrical circuits 8a, 8b or 8c to one of the various order routing devices 9a, 9b or 9c. Each order routing device is common to a group of different kinds of articles and is connected via cables 21a, 21b and 21c respectively with an indicating device 10a, 10b or 10c which indicates the kind of article to be selected from the corresponding shelf 11a, 11b or 11c either by indicating lamps or indicating drums or other suitable arrangements. The indicating devices 10a, 10b and 10c are preferably mounted on top of their respective storage shelves 11a, 11b and 11c. Near each of the shelves 11a, 11b and 11c is mounted a chute or similar arrangement 13a, 13b, 13c through which the articles are passed on to a common conveyor belt 14. This conveyor belt then transfers the articles via a chute 15 to a delivery counter 16.

The indicating devices 10a, 10b, 10c are each provided with three groups of indicating lamps 17, 18 and 19 and each group of lamps indicates the articles belonging to one order. The chutes 13a, 13b and 13c are connected over electrical circuits 20a, 20b, 20c with the corresponding order routing devices 9a, 9b, 9c to give a clearance whenever one order indicated at the indicating device has been completely delivered. This can be done manually or can be done by electrically counting the articles passing through the chute.

The operation of the system proceeds as follows:

The operator keys up the various digits of the code or designation of the wanted kind of articles on the keys 2 and thus transfers this designation via the selective switching device 7 to one of the order routing devices 9a, 9b or 9c according to this code or designation. Then the order routing device, for example the device 9a passes this designation on to a register 22a via a switching arrangement 25a which is only diagrammatically shown in the drawing. The register 22a then transfers this indication over a second switching arrangement 26a to the lamp indicator 10a and lights up a lamp in the first group 17 corresponding to the kind of article wanted from this group. It must be understood that each lamp group contains as many lamps as different kinds of articles are available at this shelf and that the electrical connections shown in the order routing device 9a are to be multipled according to the number of indicating lamps. The switching devices 25a and 26a can be rotary switches or any other suitable contact arrangements.

When the operator has keyed up the designation or code of all the wanted articles belonging to one order and has thus transferred these indications to the various indicators allotted to the shelves, he presses the "order complete" key 3 and thus operates the switching arrangement 25a in the order routing device 9a, the corresponding switching arrangements in the routing devices 9b and 9c and a busy relay common to all first registers of each shelf as will be shown later on in detail. The next order keyed up on the key set will be taken up by the second registers 23a and so on and from there will be transferred to group 18 of the indicating lamps. The same operation is repeated for the third order taken up by register 24a. In the example given, the indicating device and the order routing device are set up for simultaneous indication of thee consecutive orders as indicated by the three rows of lamps 17, 18 and 19. The sequence of these orders is indicated as well by the sequence in which they appear at these three groups of indicating lamps. When the operator has pressed the "order complete" key 3 after having keyed up the third order, a "busy" lamp 4 lights up at the operator's position over the circuit 27 which connects the "busy" relay group 28 for the various shelf groups with the operator's position. This lamp indicates to the operator that no more orders can be taken up by the system.

The store assistant who is to select the articles from the shelf allotted to him, for example shelf 11a, passes all the articles through his chute 13a to the conveyor belt 14. When he has finished one order as indicated by the group of indicating lamps 17, he operates a contact at his chute and thus clears his register 22a via the circuit 20a, extinguishing the lamp in the first lamp group 17. It must be understood that instead of manual operation an automatically working contact arrangement on the chute 13a can fulfil the same purpose. This contact arrangement is then connected with a counting device which for example, gives an indication to the register 22a when the number of articles passed through the chute 13a corresponds to the number of articles indicated by the indicating lamps of group 17.

Figure 2:
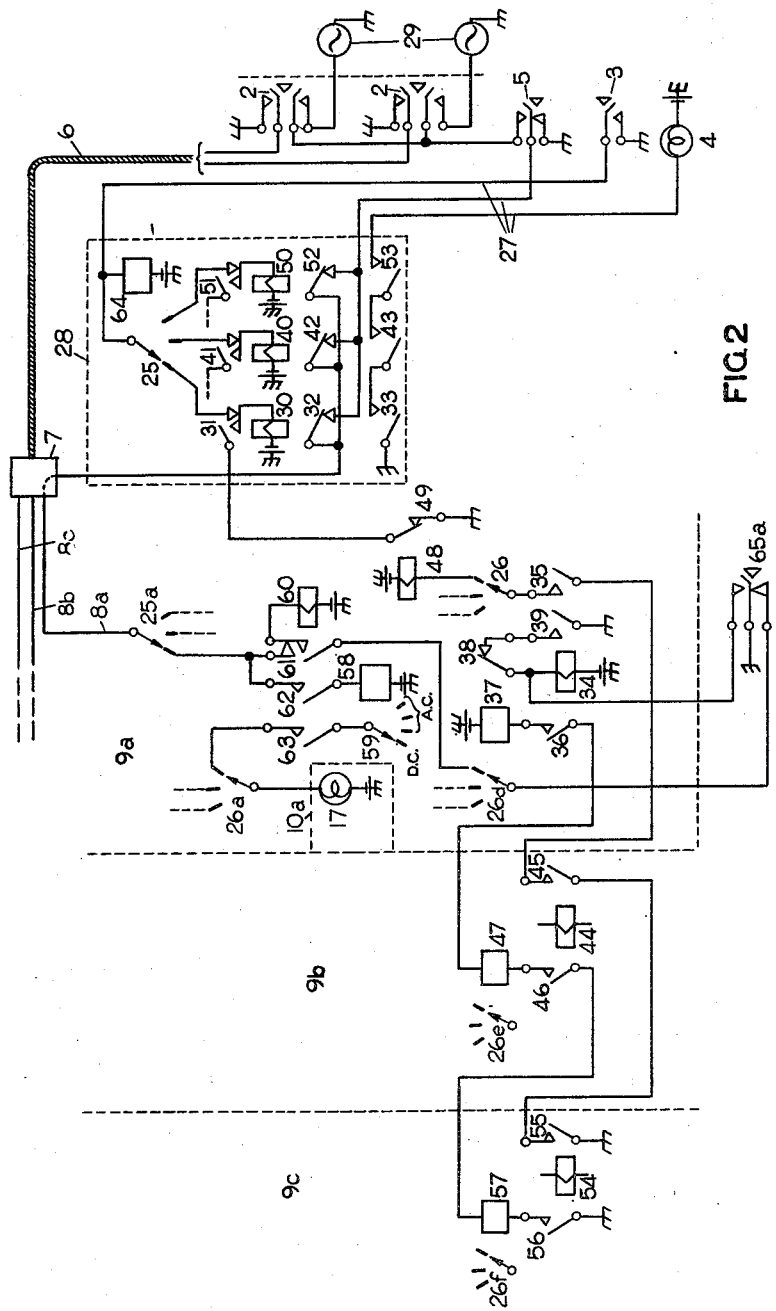
Fig. 2 shows some of the circuits which can preferably be used in connection with the arrangement shown in Fig. 1.

When all store assistants have selected the articles of the first order from their respective shelves and have passed them on to the conveying mechanism and when all the registers (22a, 22b, 22c) for the first order have been cleared, a switching arrangement such as 26a, in each order routing device 9a, 9b and 9c operates and thus connects now the registers such as 23a with the first group of indicating lamps, the register such as 24a with the second group of indicating lamps and the register such as 22a with the third group of indicating lamps. The indication which represented the second order is thus transferred to the indicating lamps 17 of the first group and the indication which represented the third order is now transferred to the indicating lamps 18 of the second group. This indicates to the store assistant that he can proceed now with the delivery of the articles wanted for the second order. At the same time the "busy" lamp 4 at the operator's position is extinguished and thus indicates that a new order can be keyed up. This new order is then recorded at register 22a in the order routing devices 9a and the corresponding registers of the order routing devices 9b and 9c, and from there via the switching arrangement 26a transferred to the third group of indicating lamps 19. The cycle of operation continues for each following order in the manner described above. Details of the circuit are given later on in connection with Fig. 2.

The arrangement described above enables the store assistant to see at any time which articles from his group are wanted for three consecutive orders. No time delay therefore need occur in collecting the articles and in transporting the articles to the delivery counter from where they can be collected after payment by the customer.

In cases where it is necessary to indicate when more than one article of the same kind is to be selected and distributed for the same order, a separate "quantity" key 5 is provided at the operator's position. The indication of the quantity of articles of the same kind which are wanted can for example be made by flickering the indicating lamp in a special rhythm corresponding to the number of articles wanted. This rhythm can be controlled by alternating currents of different frequencies and/or phase, as indicated schematically by the device 29 connected with the key arrangement 1.

Details of the electrical circuits used in an arrangement as described above are shown in Fig. 2.

It must be understood that only those parts of the circuit are shown which are necessary to show the working of the arrangement and that all duplicated circuits are omitted.

When the first order has to be put into the system, the operator presses one of the keys 2 corresponding to the designation or code of the wanted article and thus operates the selective switching device 7 which picks up and connects one of the control wires 8a via the contacts 32, 42 and 52 in parallel with earth applied to the break contact of key 5. Thus a circuit is closed for relay 60 from key 5 over the abovementioned contacts and the wire 8a and from there over the selector switch 25a, make-before-break contact 61, relay 60 to battery. Relay 60 operates its contacts 61, 62 and 63. Over the contact 61 its connection with the switch 25a is interrupted and earth is applied now from switch 65a via the selector switch 26d and the contact 61 over the winding of relay 60 so that this relay remains locked. Via contact 63, the lamp 17 lights up as direct current is applied over the selector switch 59 and switch 26a to this lamp. An additional relay group shown diagrammatically at 58 is connected via the contact 62 with switch 25a and thus with the "quantity" key 5 of the operator's position.

When the operator now wants to indicate the quantity of the wanted kind of article indicated by the indicating lamp 17, he first presses key 5 and thus removes earth from the contacts 52, 42 and 32 and the wire 8a, so that this wire cannot be picked up for further selection. At the same time the connection to switch 25a is switched over to the row of keys 2 so that when one of these keys is pressed to indicate the quantity switch 25a is connected with an alternating current source 29 connected with another contact of the keys 2. Each key 2 is connected with a separate source of alternating current of different frequency or phase to give an indication of the specific key that has been operated. This alternating current operates a relay group 58 via the following circuit: From earth and the alternating current source 29, operated key 2 and key 5 in the operator's position, via the contacts 52, 42 and 32 through the selective switching device 7, the wire 8a, the selector switch 25a, contact 62, relay group 58 to battery. The relay group 58 is thus operated in accordance with the special frequency or phase of the alternating current applied to the operated key 2 and thus moves the selector switch 59 to an appropriate outlet which introduces alternating current of specific frequency or phase into the circuit of the indicating lamp 17 via the contact 63, and switch 26a so that this lamp flickers now in a rhythm controlled by the operated key 2. This indicates to the store assistant the quantity of the article designated for selection by lamp 17.

When one complete order has been keyed up by the operator, the operator presses the key 3 which indicates that the order is completed and operates via earth applied to this key, the magnet 64 for the common selector switch 25 and the selector switches 25a and so on. At the same time the relay 30 is energised via the selector switch 25 and the make-before-break contact 31. To ensure that the relay 30 operates before the selector switch 25 moves one step further up, the switches are so arranged that the stepping up to the next contact occurs when the magnet 64 releases again after the operator has released key 3. Relay 30 locks itself from earth over contact 49 of relay 48, its own contact 31 and its winding 30 to battery. Relay 30 opens its contact 32 and closes its contact 33 to prepare the circuits for further functions as will be seen later on.

The stepping up of the switch 25a connects now the selecting circuit with the register for the next order and the selection of the wanted articles for the next order can proceed in the same was as described above.

When the second order has been completed the operator presses again the "order complete" key 3 to step up the switches 25 and 25a again and at the same time to operate the relay 40 which opens its contacts 42, closes its contact 43 and locks itself over contact 41 in a similar way as described before for relay 30. The third order is then put in by the operator in the same way. When the operator presses the "order complete" key 3 relay 50 is operated and opens its contact 52 and closes its contact 53. As mentioned before, the system described in this embodiment is built for three consecutive orders, so that no further orders can be taken up before one order has been cleared. To indicate that no more orders can be taken up, "busy" lamp 4 lights up via the closed contacts 33, 43 and 53. At the same time the control wire from earth over key 5 is interrupted at contacts 32, 42 and 52 so that a keying up of a new order at the keys 2 would be without any effect. When the last "order complete" signal has been given, the magnet 64 has operated again the switches 25 and 25a and these switches step back to the first contact and the first register connected therewith can take a new order as soon as the first order has been cleared.

When one of the store assistants has selected all the articles wanted for the first order and has passed them on to the conveyor mechanism, he operates the key 65a and thus interrupts the circuit for the relay 60. Relay 60 releases and thus opens the contact 63 extinguishing the lamp 17 for the first order. The change over of contact 61 connects relay 60 again with the first contact of switch 25a but as the line 8a is still interrupted at the contacts 32, 42 and 52 no new selection can be put into this part of the system. Over earth at the key 65a the relay 34 is energised and closes its contact 35, 36 and 39. Via the contact 39 a holding circuit for relay 34 is closed from earth over contact 39, break contact 38 of magnet 37, winding of relay 34 to battery, so that this relay remains energised when key 65a is released. The contact 36 prepares a circuit for the magnet 37 but this circuit is still interrupted at the contacts 46 and 56 of other article groups. The contact 35 prepares a circuit for the relay 48, but this circuit is still interrupted at the contacts 45 and 55 of the other shelf groups.

When all store assistants have fulfilled the first order indicated at their indicating devices and have operated their respective keys 65a and so on the relays 44 and 54 are energised in the same way as the relay 34. The contacts 45 and 55 are closed and a circuit is now completed from earth via contacts 55, 45 and 35, common selector switch 26, relay 48 to battery. The relay 48 operates, opens its contact 49 and thus interrupts the holding circuit for relay 30. Relay 30 releases, opens the contact 33 thus extinguishing the "busy" lamp 4, and closes the contact 32 thus connecting the control wire from key 5 through to the selective switching device 7. Over contact 31 relay 30 connects itself again with the selector switch 25 so that a new order can be put into the system.

When the relays 34, 44 and 54 are energised as described above, the contacts 36, 46 and 56 are closed and complete a circuit from earth over contact 56, magnet 57, contact 46, magnet 47, contact 36 and magnet 37 to earth. All the magnets operate now and move the switches 26, 26d, 26e and 26f and the order sequence switches 26a and so on one step forward, thus connecting the first lamp group with the relay group for the next order. The indications set up in the second relay group are now transferred to the first lamp group, and in the same way the third order takes the place of the second order. The magnet 37, 47 and 57 operate break contacts such as contact 38 and thus interrupt the circuit for the relays 34, 44 and 54 respectively restoring the whole circuit to its original position with the exception that the switches 26, 26d, 26e and 26f and the switches 26a are now stepped one step forward.

When a new order is put in before the other orders have been cleared, this new order would get the place of the third order indicated by the third lamp group. All other functions for any new order are the same as described above. As soon as three orders are put into the system, the "busy" signal appears and whenever one of these orders has been cleared an indication is given that the next order can be put into the system.

When only two of three different quantities of articles of the same kind have to be selected at the same time, simple arrangements can be used for the relay group 58, but it must be understood that by using more elaborate relay circuits any other number of different quantities can be indicated as well.

As each store assistant selects the articles from one article group only and gets an indication of all the articles belonging to one order simultaneously, his movements are cut down to a minimum. To adapt the system to peak and slack hours, the indicating devices can be so arranged that one store assistant may be able to watch several indicating devices and to select articles from various groups in slack periods.

When orders have to be delivered to various delivery counters, a plurality of conveyor belts 14 and chutes 13 can be provided for each of the shelves 11 and an additional signal is transmitted with each order to indicate to the store assistant to which counter or other locality the particular order has to be directed.

Many modifications of the method described above are possible without departing from the scope of the invention.

I claim:

1. A system for dispensing articles of different kinds from storage, said system comprising a control station for selecting articles for separate individual orders; storage bins arranged in groups for the storage of articles; indicating devices associated with each of said groups of storage bins and including a plurality of indicating means for each bin each of said indicating means indicating the sequence of orders of desired articles; switching means and electrical connections therefrom to said indicating means and said control station to indicate simultaneously the desired articles for consecutive orders; means operable to indicate when all of the selected articles have been taken to complete an order; and conveying means to convey said selected articles to a delivery position.

2. A system for dispensing articles of different kinds from storage, said system comprising a set of electrical contacts for selecting articles for separate individual orders; storage bins for said articles arranged in groups; indicating devices, one device being provided for each of said groups of storage bins and including a plurality of indicating means for each bin to indicate the sequence of orders of desired articles of the same kind; switching means to selectively connect said set of electrical contacts with said indicating means for the simultaneous indication of desired articles of consecutive orders; means associated with each indicating device to give a signal when all articles indicated at said indicating device have been removed from storage; further means operable to indicate when all of the selected articles have been taken to complete an order; and conveying means to convey said selected articles to a delivery position.

3. A system for dispensing articles of different kinds from storage said system comprising a control station including a keyset for the selecting of articles of different orders; storage bins for said articles arranged in groups; an indicating device for each of said groups including a plurality of indicating means for each bin to indicate the selection of the same article for consecutive orders; a plurality of switching arrangements connectable with the indicating means of each bin to indicate articles desired for one order on a corresponding indicating means, to store said indication, and to transfer said indication to another indicating means of the same bin upon completion of an order; switching means and electrical connections therefrom to said control station and operable thereby, said switching means being electrically connected with said switching arrangements to control said indicating means; means operable to indicate when all selected articles have been taken to complete an order, said means controlling said switching arrangements for the transfer of indications from one to the other indicating means; and conveying means to convey said selected articles to a delivery position.

4. A system for dispensing articles of different kinds as claimed in claim 3 in which said control station includes means operable by said switching arrangements to give a signal when all switching arrangements have stored indications for desired articles.

5. A system for dispensing articles of different kinds from storage, said system comprising storage bins for the storage of articles, indicating means associated therewith for the indication of desired articles; a control station; switching means and electrical connections therefrom to said control station and said indicating means; said control station including a key set for the selection of desired articles, sources of alternating current and switching means to connect said sources of alternating current with said key set to modify upon additional operation of one of the keys of said key set the indication representing a selected kind of article at said indicating device in accordance with the quantity desired.

6. A system for dispensing articles of different kinds as claimed in claim 5 and in which indication control means including sources of alternating current are associated with said indicating means to selectively connect said indicating means with one of said sources of alternating current under the control of said control station.

GEORG F. CHODZIESNER.

REFERENCES CITED

The following references are of record in the file of this patent:

UNITED STATES PATENTS

| Number | Name | Date |
|---|---|---|
| 1,353,996 | Hall | Sept. 28, 1920 |
| 1,602,753 | Davis | Oct. 12, 1926 |
| 1,625,490 | Morris | Apr. 19, 1927 |
| 1,722,342 | St. John | July 30, 1929 |
| 1,794,626 | Langdon | Mar. 3, 1931 |
| 2,416,870 | Farmer | Mar. 4, 1947 |

FOREIGN PATENTS

| Number | Country | Date |
|---|---|---|
| 371,964 | Great Britain | of 1932 |